United States Patent [19]

Senyek

[11] 4,399,240

[45] Aug. 16, 1983

[54] REMOVAL OF ACRYLONITRILE FROM LATEX WITH SATURATED HETEROCYCLIC AMINES

[75] Inventor: Michael L. Senyek, Tallmadge, Ohio

[73] Assignee: The Goodyear Tire & Rubber Company, Akron, Ohio

[21] Appl. No.: 336,001

[22] Filed: Dec. 30, 1981

[51] Int. Cl.$^3$ ............................................... C08K 5/35
[52] U.S. Cl. ..................................... 523/332; 524/96; 528/492
[58] Field of Search .................... 528/492; 524/96; 523/332

[56] References Cited

U.S. PATENT DOCUMENTS

| | | | |
|---|---|---|---|
| 3,779,972 | 12/1973 | Minieri | 528/492 |
| 3,803,113 | 4/1974 | Gluntz et al. | 528/492 |
| 4,020,267 | 4/1977 | Park | 528/492 |
| 4,098,991 | 7/1978 | Karg | 528/492 |
| 4,251,412 | 2/1981 | Ferrini | 528/492 |

Primary Examiner—Joseph L. Schofer
Assistant Examiner—N. Sarofim
Attorney, Agent, or Firm—Alvin T. Rockhill

[57] ABSTRACT

Acrylonitrile is a monomer that is widely used in the synthesis of a vast variety of polymers. Undesirable quantities of unpolymerized residual acrylonitrile are often present in these acrylonitrile polymers. This residual or free acrylonitrile dissolved in an acrylonitrile polymer and/or its emulsifier system and the water phase used in its polymerization can be reduced significantly in concentration by treatment with saturated 6 to 7 membered ring heterocyclic amines. These amines react with acrylonitrile by a nitrogen-cyanoethylation reaction which results in the formation of a tertiary amino linkage.

12 Claims, No Drawings

REMOVAL OF ACRYLONITRILE FROM LATEX WITH SATURATED HETEROCYCLIC AMINES

BACKGROUND OF THE INVENTION

Acrylonitrile monomer is a basic building block for a number of very important polymers. By polymerizing acrylonitrile polyacrylonitrile may be obtained. It is a white fiber that has a very good resistance to acids, common solvents, oils, greases, salts, and sunlight. Nitrile rubbers which have excellent abrasion, oil and chemical resistance are prepared by the copolymerization of butadiene and acrylonitrile. Acrylonitrile monomer can be utilized in a great many other copolymers and terpolymers.

After the synthesis of a polymer that contains linkages that are derived from acrylonitrile is completed, some unpolymerized acrylonitrile monomer will still be present. Polymers that contain acrylonitrile linkages, acrylonitrile polymers, are normally synthesized by emulsion polymerization in an aqueous system. The unpolymerized residual acrylonitrile normally remains in both the acrylonitrile polymer itself and in the water. The normal procedure of stripping by vacuum or steam does not usually remove all of this undesirable residual acrylonitrile. Since acrylonitrile is believed to be toxic, it would be highly desirable to remove substantially all free residual acrylonitrile.

SUMMARY OF THE INVENTION

Residual acrylonitrile dissolved in acrylonitrile polymers and/or the emulsifier system and water phase used in their polymerization can be reduced very significantly in concentration by treatment with saturated 6 to 7 membered ring heterocyclic amines. These saturated heterocyclic amines are very effective in reacting with acrylonitrile by adding across its double bond, thus reducing its concentration in a medium.

DETAILED DESCRIPTION

The concentration of residual acrylonitrile dissolved in polymers and/or the emulsifier system and water phase used in the polymerization of a polymer can be reduced very dramatically by treatment with saturated heterocyclic amines. Saturated 6 to 7 membered ring heterocyclic amines have been determined to be an excellent choice as an agent for removal of residual acrylonitrile from polymer latex emulsions. Saturated 6 to 7 membered ring heterocyclic amines contain no double or triple bonds, contain a ring structure with 6 or 7 atoms in the ring, and having at least one secondary amine moiety (>N-H group) in the ring. The following representative examples of saturated 6 to 7 membered ring heterocyclic amines that can be used to reduce the free acrylonitrile concentration in a polymer emulsion containing free acrylonitrile are intended to illustrate but not limit the scope of the present invention:

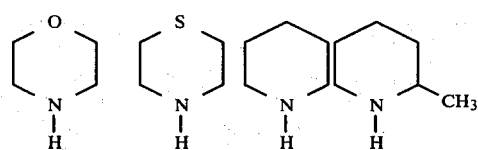

Morpholine Thiomorpholine Piperidine 2-methylpiperidine

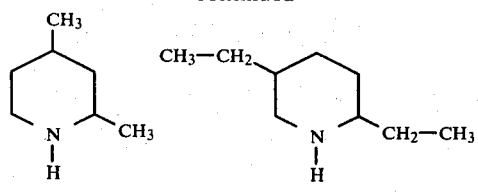

2,4-dimethyl-piperidine    2,5-diethylpiperidine

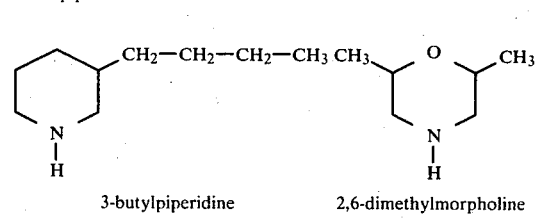

3-butylpiperidine    2,6-dimethylmorpholine

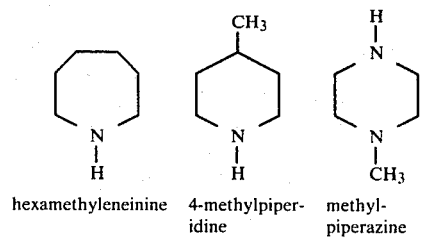

hexamethyleneinine    4-methylpiperidine    methylpiperazine

Difunctional saturated 6 to 7 membered ring heterocyclic amines offer a very substantial improvement over amines in general as an agent for acrylonitrile removal. These difunctional heterocyclic amines are greatly superior to even the best amines that have been disclosed in the prior art in their ability to reduce the concentration of residual acrylonitrile in an acrylonitrile polymer latex. Difunctional saturated 6 to 7 membered ring heterocyclic amines contain at least two amine moieties (>N-H or —NH$_2$ groups), with at least one secondary amine moiety (>N-H group) being in the 6 or 7 membered ring. Some representative examples of difunctional saturated 6 to 7 membered ring heterocyclic amines include:

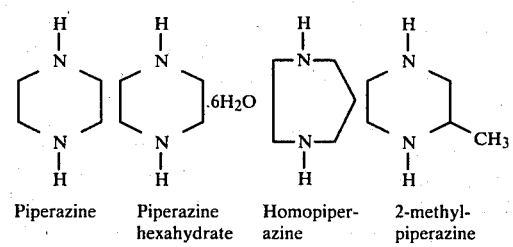

Piperazine    Piperazine hexahydrate    Homopiperazine    2-methylpiperazine

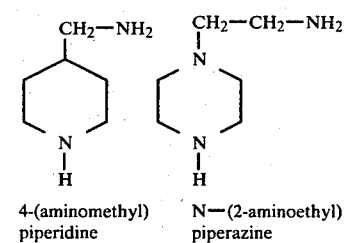

4-(aminomethyl) piperidine    N—(2-aminoethyl) piperazine

-continued

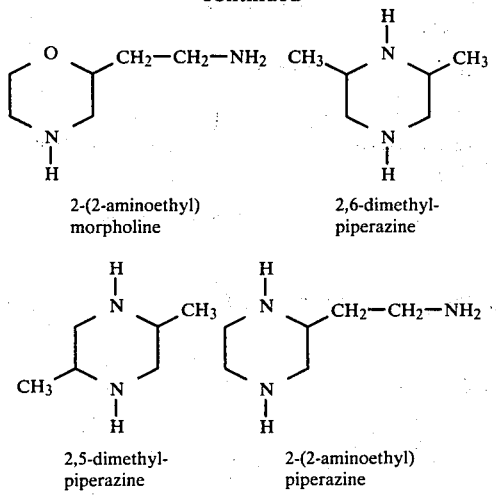

2-(2-aminoethyl)
morpholine 2,6-dimethyl-
piperazine 2,5-dimethyl-
piperazine 2-(2-aminoethyl)
piperazine These difunctional saturated heterocyclic amines react with residual acrylonitrile by a nitrogen-cyanoethylation reaction with the reaction product remaining in the polymer system. For example, when reacted with piperazine addition across the double bond of acrylonitrile occurs according to the reaction:

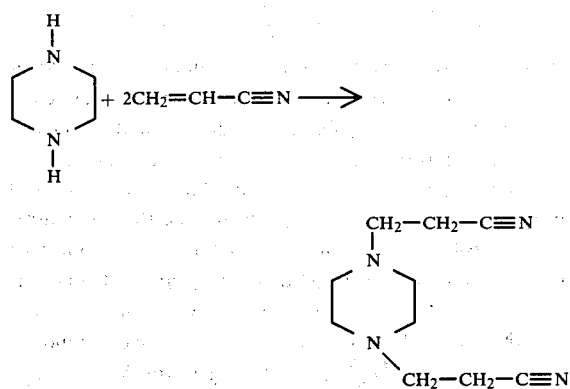

This addition across the double bond of acrylonitrile results in the formation of a tertiary amino linkage. The unhindered nitrogen atom of the amine group in a saturated heterocyclic amine is more readily available for reaction with free acrylonitrile in an aqueous polymer latex emulsion or in the polymer latex. Preferred difunctional saturated heterocyclic amines are soluble in the aqueous latex media being treated. Water insoluble amines are less effective and their use can result in coagulum formation.

This invention discloses an improved process for reducing the concentration of residual acrylonitrile in an acrylonitrile polymer emulsion containing free acrylonitrile, comprising adding to said acrylonitrile polymer emulsion a saturated 6 to 7 membered ring heterocyclic amine in amounts and under conditions sufficient to react with said residual acrylonitrile.

The amount of amine needed to remove all residual acrylonitrile must be at least equivalent stoichiometrically to the amount of residual acrylonitrile present. This stoichiometric relationship is based on the amount of residual acrylonitrile present in the system and the number of amine groups needed to react with that amount of acrylonitrile. For example, if one mole of acrylonitrile was present in a system at least one mole of a saturated heterocyclic amine containing one secondary amine group or one-half mole of a saturated heterocyclic diamine containing two secondary amine groups would be needed to eliminate all of the free acrylonitrile. Very low concentrations of residual acrylonitrile have been obtained when about 1½ to 2 times the stoichiometric amount of saturated heterocyclic amine required to react with the free acrylonitrile present in an acrylonitrile polymer emulsion have been used. Even larger amounts of saturated heterocyclic amines may be used to react with residual acrylonitrile, but the use of larger amounts than necessary does not appear to be advantageous. If it is desirable to remove only part of the residual acrylonitrile, then, of course, less than the stoichiometric amount of amine can be used.

This process for reacting free acrylonitrile with saturated 6 to 7 membered ring heterocyclic amines can be used in an aqueous emulsion of any polymer containing free acrylonitrile. This process is particularly useful in acrylonitrile polymers which are polyacrylonitrile and copolymers formed by the polymerization of acrylonitrile with other vinyl comonomers. For example, this process is very useful for nitrile rubbers which are prepared by the copolymerization of butadiene and acrylonitrile. The monomer ratio between acrylonitrile and butadiene in nitrile rubbers may be varied over a wide range, however, normally no more than 50 percent of the nitrile rubbers chain linkages are derived from acrylonitrile. Other comonomers that may be polymerized with acrylonitrile to form polymers in which this process of removing residual acrylonitrile is useful include styrene, isoprene, alkyl acrylates, such as methyl acrylate, ethyl acrylate, butyl acrylate, methyl methacrylate and the like; vinylidene monomers having one or more terminal CH$_2$=C< groups; vinyl aromatics such as α-methylstyrene, bromostyrene, chlorostyrene, fluorostyrene, vinylphenol, 3-hydroxy-4-methoxystyrene, vinylanisole, β-nitrostyrene, and the like; α-olefins such as ethylene; vinyl halides, such as vinylbromide, chloroethene (vinylchloride), vinylfluoride, vinyliodide, 1,2-dibromoethene, 1,1-dichloroethylene (vinylidene chloride), 1,2-dichloroethylene, and the like; vinyl esters such as vinyl acetate; α,β-olefinically unsaturated nitriles, such as methacrylonitrile; α,β-olefinically unsaturated amides such as acrylamide, N-methyl acrylamide, N-t-butyl acrylamide, N-cyclohexyl acrylamide, diacetone acrylamide, methacrylamide, N-ethyl methacrylamide, and the like; α,β-olefinically unsaturated N-alkylol amides having the general structural formula:

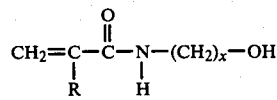

wherein R is a hydrogen atom or an alkyl group containing from 1 to 4 carbon atoms and x is an integer from 1 to 4 inclusive, such as N-methylol acrylamide, N-ethylol acrylamide, N-propylol acrylamide, N-methylol methacrylamide, N-ethylol methacrylamide, and the like; vinyl pyridine; n-octyl methacrylate, dodecyl methacrylate, methyl ethacrylate and ethyl ethacrylate; haloalkyl acrylates such as chloropropyl acrylate; methacrylates; hydroxyethylacrylate; polyfunctional compounds such as ethylene glycol dimethacrylate, diethylene glycol diacrylate, divinyl benzene, alkenyl pentaerythritol, methylene-bis-acrylamide, and the like; α-β-olefinically unsaturated carboxylic acids containing from 3 to 10 carbon atoms such as methacrylic acid, acrylic acid, crotonic acid, β-acryloxy propionic acid, sorbic acid, hydrosorbic acid, α-chlorosorbic acid, cinnamic acid, β-styrlacrylic acid, itaconic acid, citraconic acid, maleic acid, fumaric acid, mesaconic acid, aconitic acid, and glutaconic acid.

In the polymerization of acrylonitrile monomer with one or more of the above-mentioned monomers there can be competing or side reactions which take place. Therefore, the choice of reactants, process conditions, order of addition of the reactants and the like should be selected in order to produce a useful polymer containing acrylonitrile linkages. In general, the resulting copolymer, terpolymer or multimonomer polymer should contain at least about 5 percent by weight of acrylonitrile. If the polymer is a copolymer with acrylonitrile, the acrylonitrile portion may be as high as about 95 percent by weight of the resulting copolymer. The polymers which are preferred are polyacrylonitrile, butadiene-acrylonitrile copolymers, styrene-butadiene-acrylonitrile terpolymers, acrylonitrile-butadiene-methacrylic acid terpolymers, and terpolymers of acrylonitrile, butadiene, and acrylic acid.

The polymers for which this process is useful may be synthesized using any conventional polymerization technique. Emulsifiers used in the polymerization of such polymers may be charged at the outset of the polymerization or may be added incrementally or by proportioning as the reaction proceeds. Generally, anionic emulsifier systems provide good results, however, any of the general types of anionic, cationic or nonionic emulsifiers may be employed in the polymerization. Normally, such an emulsion polymerization can be run over a very wide temperature range, with good results being obtained when the reaction is run from about 5° C. to 80° C. for many common polymers. The polymerization of these acrylonitrile containing polymers may be initiated using free radical catalysts, ultraviolet light, or radiation. To insure a satisfactory polymerization rate, uniformity, and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butyl hydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-d-(t-butylperoxy) cyclohexane, and the like.

The water soluble peroxygen free radical initiators are especially useful in aqueous emulsion polymerization. It may be desirable to add post-polymerization emulsifiers and stabilizers, which will not interfere with this process for removing residual acrylonitrile.

Saturated 6 to 7 membered ring heterocyclic amines can be added to the free acrylonitrile containing aqueous emulsion at any time after the polymerization of the acrylonitrile polymer has been completed. Normally, the saturated 6 to 7 membered ring heterocyclic amine will be added immediately after the polymerization is completed and prior to the separation of the emulsion to maximize the reaction time between the free acrylonitrile and the amine. However, the amine may be added directly to the polymerization reactor, flash tank, storage tank or finished latex. This reaction will take place over a wide temperature range with very good results being obtained from about 0° to 95° C.

In practice, it is contemplated that the molar equivalent of amine moiety used will be 0.5 to 3 times the number of moles of free acrylonitrile present in the emulsion. If the time period in which the amine has to react with the acrylonitrile is short, it will be desirable to use even greater amounts of the amine.

Preferred saturated 6 to 7 membered ring heterocyclic amines are soluble in the aqueous latex medium being treated within the preferred operating temperature range of 0° to 95° C.

It is permissible and sometimes preferable to steam and/or vacuum strip the polymer emulsion to remove as much free acrylonitrile as possible and then to use a saturated 6 to 7 membered ring heterocyclic amine to react with the remainder of the free acrylonitrile which is difficult or impossible to remove completely by stripping techniques. By utilizing this combination of methods for reducing the free acrylonitrile content of an emulsion, less amine need be used.

This process is of tremendous value in the treatment of effluent streams wherein undesirable amounts of acrylonitrile are dissolved. By treating aqueous effluents from manufacturing plants that utilizing acrylonitrile monomer with saturated 6 to 7 membered ring heterocyclic amines the amount of free acrylonitrile being emitted into the environment would be minimized. A further application of this process would be the use of saturated 6 to 7 membered ring heterocyclic amines as gas scrubbers where gaseous effluents from reactors and the like contain undesirable acrylonitrile that is vented to the atmosphere.

DESCRIPTION OF THE PREFERRED EMBODIMENTS

This invention is illustrated by the following examples which are merely for the purpose of illustration and are not to be regarded as limiting the scope of the invention or manner in which it may be practiced. Unless specifically indicated otherwise, parts and percentages are given by weight. A typical copolymer latex of 1,3-butadiene and acrylonitrile (nitrile rubber) was used in the following examples. The charge composition used in the synthesis of this nitrile rubber latex was 140 parts water, 11 parts rosin acid (soap), 0.1 parts sodium sulfate, 45.0 parts acrylonitrile, 55.0 parts 1,3-butadiene, 0.2 parts potassium persulfate ($K_2S_2O_8$) and 0.1 parts t-dodecyl mercaptan. Of the rosin acids about 90 percent are isometric with abietic acid and the other 10 percent is a mixture of dihydroabietic acid and dehydroabietic acid. The concentrations of residual acrylonitrile given in the following examples were determined by head-space gas chromatographic analysis.

In the procedure used 0.5 gram samples of latex containing an internal standard were diluted to 5 ml. (milliliters) with deionized water. After heating the samples at 90° C. for one hour, a head space vapor aliquot was analyzed in a Perkin-Elmer Head Space Injector F42 Chromatograph. A ⅛ inch diameter by 4 feet (2×2) column packed with 100-120 mesh Chromosorb 104 was utilized.

EXAMPLES 1 THROUGH 10

To a series of 4-ounce bottles, 100 gram aliquots of nitrile rubber latex (about 40% solids) were added. Specified amounts of various amines were diluted with water to about 15% to 20% solutions and added to the latex at 25° C. The solutions were mixed by shaking and allowed to stand for 24 hours. The latex samples were than analyzed for residual acrylonitrile. In these examples a direct comparison between the effectiveness of indole and some saturated 6 to 7 membered ring heterocyclic amines was made. Indole which has the structural formula:

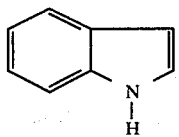

has been cited as being useful for reducing acrylonitrile concentrations in the prior art. The concentration of free acrylonitrile after treatment with various molar ratios of amine to free acrylonitrile is given in Table I. The percent reduction in residual acrylonitrile concentration from the original concentration of 3015 ppm (parts per million) is also shown.

TABLE I

| Example | Amine | Molar Ratio (Amine/Acrylonitrile) | Treated Latex Free Acrylo-Nitrile Concentration, ppm | % Reduction in Free Acrylonitrile |
|---|---|---|---|---|
| 1 | Indole | 1 | 2920 | 3 |
| 2 | Piperazine | 1 | 73 | 98 |
| 3 | Indole | 1.5 | 2510 | 17 |
| 4 | Piperazine | 1.5 | 44 | 99 |
| 5 | N—(2-aminoethyl)piperazine | 1.5 | 77 | 97 |
| 6 | Indole | 2 | 2475 | 18 |
| 7 | Piperazine | 2 | 33 | 99 |
| 8 | Morpholine | 2 | 67 | 98 |
| 9 | N—(2-aminoethyl)piperazine | 2 | 50 | 98 |
| 10 | Indole | 2.5 | 2370 | 21 |

Piperazine, morpholine, and N-(2-aminoethyl)piperazine were shown to be vastly superior to indole as agents for residual acrylonitrile removal. These saturated 6 to 7 membered ring heterocyclic amines reduced the concentration of free acrylonitrile much better than indole at equal molar ratios. In fact, treatment with a molar ratio of one of piperazine reduced the amount of free acrylonitrile by over 4 times as much as did treatment with a molar ratio of 2.5 of indole. The heterocyclic amine indole is very greatly inferior to these saturated 6 to 7 membered ring heterocyclic amines in its usefulness as an agent to reduce the concentration of residual acrylonitrile in polymer latex emulsions. These saturated 6 to 7 membered ring heterocyclic amines are an excellent choice as agent for removal of residual acrylonitrile in acrylonitrile polymer latex emulsions.

EXAMPLES 11 AND 12

Piperazine and indole were used to treat the nitrile rubber emulsions as specified in Examples 1 through 10, except the samples were only treated for 1½ hours at 60° C. before testing for residual acrylonitrile concentrations. The results are shown in Table II. The concentration of acrylonitrile in the samples before treatment was 3015 ppm.

TABLE II

| Example | Amine | Molar Ratio (Amine/Acrylonitrile) | Treated Latex Free Acrylonitrile Concentration, ppm | % Reduction in Free Acrylonitrile |
|---|---|---|---|---|
| 11 | Piperazine | 2 | 35 | 99 |
| 12 | Indole | 2 | 2540 | 16 |

These examples indicate that treatment with piperazine for 1½ hours at 60° C. is very effective for reducing the concentration of free acrylonitrile in latex emulsions and that treatment with indole under these conditions is not very effective. Under identical conditions, piperazine reduced the amount of residual acrylonitrile in the samples by over 6 times as much as indole.

EXAMPLES 13 THROUGH 15

Piperazine and benzimidazole were used to treat the nitrile rubber latex samples as specified in Examples 1 through 10, except the samples were treated for 2 hours at 50° C. and then for 22 hours at 25° C. The concentration of acrylonitrile in the samples before treatment was 2630 ppm. The results are given in Table III.

TABLE III

| Example | Amine | Molar Ratio (Amine/Acrylonitrile) | Treated Latex Free Acrylonitrile Concentration, ppm | % Reduction in Free Acrylonitrile |
|---|---|---|---|---|
| 13 | Benzimidazole | 2 | 1490 | 43 |
| 14 | Benzimidazole | 3 | 1190 | 55 |
| 15 | Piperazine | 1 | 77 | 97 |

As can be determined from these examples, piperazine is much more effective than benzimidazole in reducing residual acrylonitrile levels in a polymer latex. Benzimidazole is a heterocyclic amine with the structural formula:

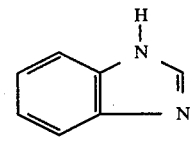

A molar ratio of one of piperazine reduced the amount of acrylonitrile in the sample by 97% and a molar ratio of two of benzimidazole reduce the amount of acrylonitrile by only 43%.

EXAMPLES 16 THROUGH 25

Various amines were used to treat the latex samples by the process as specified in Examples 1 through 10. In these examples the original concentration of free acrylonitrile before treatment was 3520 ppm. In these examples a direct comparison between the effectiveness of di-n-butylamine (a dialkyl amine) and some saturated 6 to 7 membered ring heterocyclic amines was made. Dialkyl amines have been cited as being particularly preferred for acrylonitrile removal in the prior art. The results are shown in Table IV.

TABLE IV

| Example | Amines | Molar Ratio (Amine/ Acrylonitrile) | Treated Latex Free Acrylonitrile Concentration, ppm | % Reduction in Free Acrylonitrile |
|---|---|---|---|---|
| 16 | Piperazine | 1.5 | 52 | 99 |
| 17 | N—(2-aminoethyl)piperazine | 1.5 | 70 | 98 |
| 18 | Piperazine | 2 | 38 | 99 |
| 19 | N—(2-aminoethyl)piperazine | 2 | 56 | 98 |
| 20 | di-n-butyl amine | 2 | 770 | 78 |
| 21 | dicyclohexylamine | 2 | 2480 | 30 |
| 22 | dibenzylamine | 2 | 1550 | 56 |
| 23 | di-n-butylamine | 3 | 660 | 81 |
| 24 | dicyclohexylamine | 3 | 1790 | 49 |
| 25 | dibenzylamine | 3 | 1200 | 66 |

Both saturated heterocyclic amines, piperazine and N-(2-aminoethyl) piperazine were very effective in reducing the level of free acrylonitrile in the latex samples. The non-heterocyclic amines failed to effectively reduce the residual acrylonitrile concentration to a low level. The structural formulas for these non-heterocyclic amines are as follows:

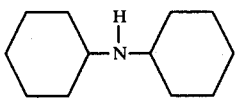

Dicylcohexylamine

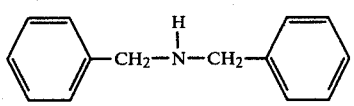

Dibenzylamine

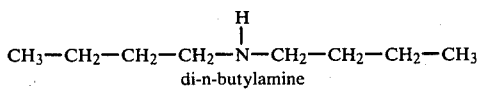

di-n-butylamine

In addition, di-n-butylamine caused extensive coagulation of the latex rendering it unacceptable for use. Saturated 6 to 7 membered ring heterocyclic amines can be employed without causing coagulation.

EXAMPLES 26 THROUGH 29

Piperazine and dimethylamine were used to treat the nitrile rubber latex samples as specified in Examples 1 through 10. In these examples the original concentration of free acrylonitrile in the samples before treatment was 6785 ppm. Dimethylamine is a dialkyl amine with the structural formula:

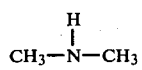

The results of these experiments are given in Table V.

TABLE V

| Example | Amine | Molar Ratio (Amine/ Acrylonitrile) | Treated Latex Free Acrylonitrile Concentration, ppm | % Reduction in Free Acrylonitrile |
|---|---|---|---|---|
| 26 | Piperazine | .8 | 115 | 98 |
| 27 | Dimethylamine | .8 | 2915 | 57 |
| 28 | Piperazine | 1 | 61 | 99 |
| 29 | Dimethylamine | 1 | 1695 | 75 |

As can be determined from these examples, piperazine showed substantially better reduction than dimethylamine at equal molar ratios. Treatment with lower molar ratios of piperazine would be advantageous since less amine would be available for side reactions and coagulum formation.

One advantage in the use of piperazine to reduce the concentration of residual acrylonitrile in acrylonitrile latex emulsions is that it may be added directly to the latex without prior dilution with water or any other media. The direct addition of piperazine to the latex results in no dilution of latex solids.

EXAMPLES 30 THROUGH 35

In addition to piperazine; piperidine and morpholine were used to treat the latex samples by the process as specified in Examples 1 through 10. In these examples the original concentration of residual acrylonitrile before treatment was 3190 ppm. The results are given in Table VI.

TABLE VI

| Example | Amine | Molar Ratio (Amine/ Acrylonitrile) | Treated Latex Free Acrylonitrile Concentration, ppm | % Reduction in Free Acrylonitrile |
|---|---|---|---|---|
| 30 | Piperazine* | 1 | 70 | 98 |
| 31 | Piperazine* | 2 | 20 | 99 |
| 32 | Piperidine | 2 | 98 | 97 |
| 33 | Morpholine | 2 | 66 | 98 |
| 34 | Piperidine | 2.5 | 60 | 98 |
| 35 | Morpholine | 2.5 | 40 | 99 |

*As Piperazine Hexahydrate

Morpholine and piperidine reduced the concentration of residual acrylonitrile very dramatically in this acrylonitrile polymer latex emulsion. They are very valuable as agents for acrylonitrile removal.

EXAMPLE 36

Homopiperazine was used to treat the nitrile rubber latex samples by the process as specified in Examples 1 through 10. In this example the sample had a concentration of acrylonitrile before treatment of 2630 ppm. After treatment with a molar ratio of 3 of homopiperazine the acrylonitrile concentration was reduced to 55 ppm, which is a reduction of 98%. As can be determined from this example, homopiperazine is very effective for use as an agent for acrylonitrile removal.

While certain representative embodiments and details have been shown for the purpose of illustrating the invention, it will be apparent to those skilled in this art that various changes and modifications may be made therein without departing from the scope of the invention.

What is claimed is:

1. An improved process for reducing the concentration of free acrylonitrile in an acrylonitrile polymer emulsion containing free acrylonitrile, comprising adding to said acrylonitrile polymer emulsion a saturated 6 to 7 membered ring heterocyclic amine wherein said ring contains at least one secondary amine moiety in amounts and under conditions sufficient to react with said free acrylonitrile to form a tertiary amino linkage.

2. An improved process as specified in claim 1 wherein said saturated 6 to 7 membered ring heterocyclic amine is a difunctional saturated 6 to 7 membered ring heterocyclic amine.

3. An improved process for reducing the concentration of free acrylonitrile in an acrylonitrile polymer emulsion containing free acrylonitrile, comprising adding to said acrylonitrile polymer emulsion a saturated 6 to 7 membered ring heterocyclic amine selected from the group consisting of piperazine hexahydrate, piperazine, homopiperazine, N-(2-aminoethyl)piperazine, 4-(aminomethyl)piperidine, 2-methylpiperazine, 2,6-dimethylpiperazine, and 2,5-dimethylpiperazine in amounts and under conditions sufficient to react with said free acrylonitrile to form a tertiary amino linkage.

4. An improved process as specified in claim 3, wherein said saturated 6 to 7 membered ring heterocyclic amine is piperazine.

5. An improved process as specified in claim 1 wherein said saturated 6 to 7 membered ring heterocyclic amine is selected from the group consisting of morpholine, thiomorpholine, piperidine, hexamethyleneimine, 4-methylpiperidine, and 2,6-dimethylmorpholine.

6. An improved process as specified in claim 3 wherein at least a stoichiometric amount of said saturated 6 to 7 membered ring heterocyclic amine is added to react with said free acrylonitrile.

7. An improved process as specified in claim 3 wherein said saturated 6 to 7 membered ring heterocyclic amine is added to said acrylonitrile polymer emulsion at any time after the polymerization of said acrylonitrile polymer has been completed.

8. An improved process as specified in claim 7 wherein said saturated 6 to 7 membered ring heterocyclic amine is added to said acrylonitrile polymer emulsion immediately after the polymerization of said acrylonitrile polymer has been completed.

9. An improved process as specified in claim 3 wherein said saturated 6 to 7 membered ring heterocyclic amine is added to said acrylonitrile polymer emulsion which is at a temperature of 0° to 95° C.

10. An improved process as specified in claim 3 wherein said acrylonitrile is a copolymer of butadiene and acrylonitrile.

11. An improved process as specified in claim 3 wherein said copolymer of butadiene and acrylonitrile has up to 50 percent of its chain linkages being derived from acrylonitrile.

12. An improved process as specified in claim 3 wherein said acrylonitrile polymer is selected from the group consisting of polyacrylonitrile; copolymers of ethylacrylate and acrylonitrile; copolymers of styrene and acrylonitrile; copolymers of isoprene and acrylonitrile; terpolymers of butadiene, styrene and acrylonitrile; terpolymers of butadiene, methacrylic acid, and acrylonitrile; terpolymers of butadiene, acrylonitrile, and acrylic acid; terpolymers of butadiene, acrylonitrile, and hydroxyethylacrylate; and copolymers of butadiene, acrylonitrile, styrene, and itaconic acid.

* * * * *